Oct. 10, 1933.  T. NICOLAU Y GRIÑÓ ET AL  1,929,815
APPARATUS FOR PROJECTING ANIMATED PICTURES ON A SCREEN
Filed Feb. 3, 1932
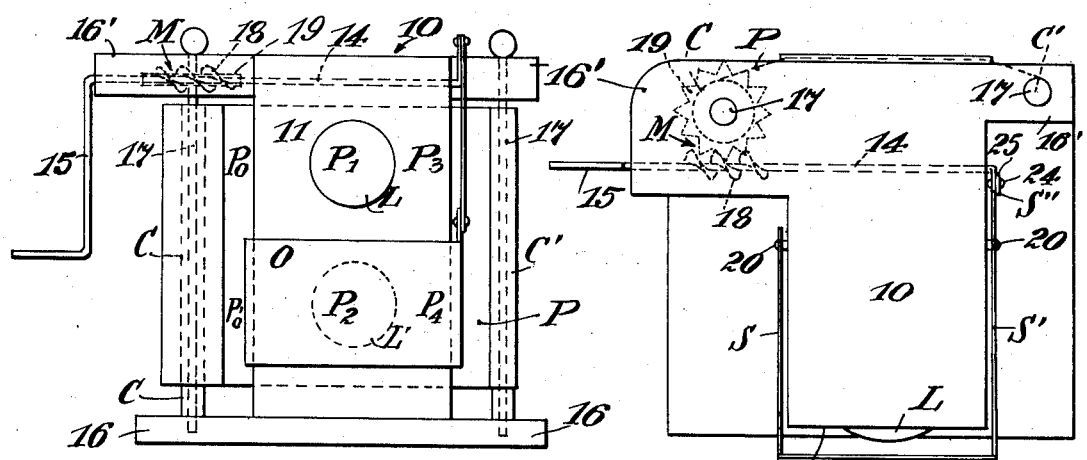
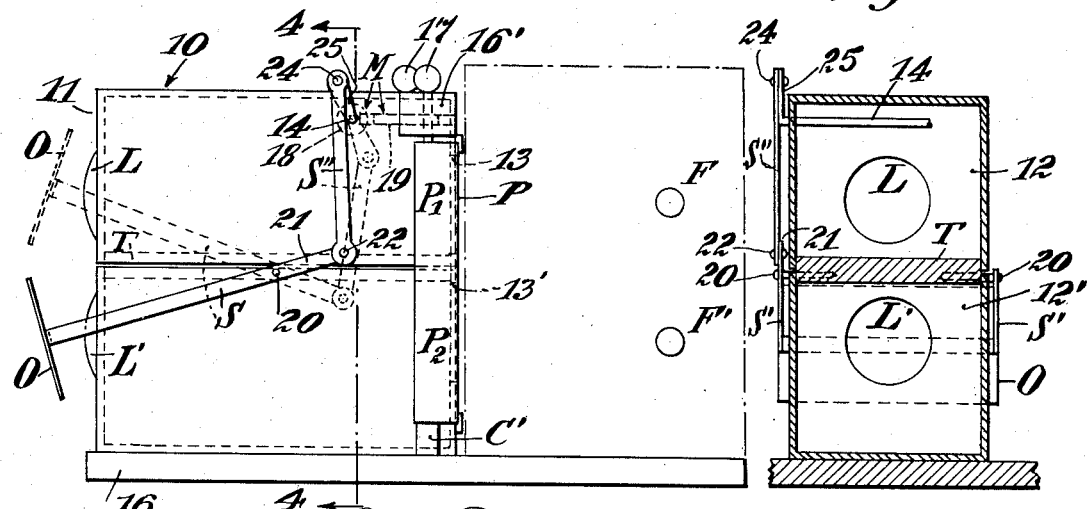
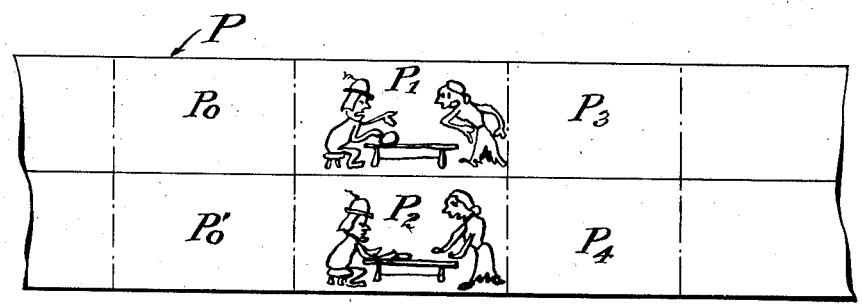
INVENTORS
Tomas Nicolau y Griñó
and Jose Maria Nicolau y Griñó
By C. P. Goepel
their ATTORNEY Patented Oct. 10, 1933

1,929,815

UNITED STATES PATENT OFFICE 1,929,815

APPARATUS FOR PROJECTING ANIMATED PICTURES ON A SCREEN

Tomas Nicolau y Griñó and Jose Maria Nicolau y Griñó, Barcelona, Spain

Application February 3, 1932, Serial No. 590,680, and in Spain April 25, 1931

7 Claims. (Cl. 88—16.6)

This invention relates to apparatus for projecting animated pictures on a screen.

An object of the invention is to provide simple and improved apparatus of this character, wherein inexpensive means are utilized, in a manner as hereinafter set forth, for the projection of views and scenes, and more particularly to provide a novel construction and arrangement which may be usefully employed, for example, in motion picture apparatus capable of being used in homes and operated in safety by children as well as by adults.

In order to make the invention clear it is illustrated by way of example in the accompanying drawing, in which:

Figure 1 is a front view of an apparatus constructed in accordance with our invention;

Fig. 2 is a side elevational view of the apparatus, showing diagrammatically in connection therewith the sources of light together with a housing which is shown in broken outline;

Fig. 3 is a top plan view of the apparatus shown in Fig. 1;

Fig. 4 is a vertical sectional view, taken on the line 4—4 of Fig. 2; and

Fig. 5 is a fragmentary representation of a paper film.

The apparatus shown in the drawing consists of an elongated casing 10 provided in its front end 11 with upper and lower lenses L and L', and the interior of this casing is divided into upper and lower light chambers 12 and 12' by means of a horizontal partition T in such a way that the light given out by the source F illuminates the lens L only and the light given out by the source F' illuminates the lens L' only. Suitable openings 13 and 13' are provided in the rear of the casing, and the sources of light F and F' are located so that their rays will pass forwardly into and through the chambers 12 and 12' to illuminate the lenses L and L'. The sources of light L and L' may consist, and preferably do consist, in the interest of safety, of incandescent lamps, and they may be provided with a suitable housing (not shown) for directing the rays into the light chambers and to the lenses.

A single driving mechanism M is provided for operating a shutter O to alternatively cover and uncover the lenses L and L', and for operating film mechanism comprising film supporting rollers C, C' and a film P. This driving mechanism comprises a shaft 14 to which at one end thereof is attached a hand crank 15, said shaft being mounted for rotation in the top of the casing adjacent the rear end thereof and extending in a transverse direction with respect to the length of the casing so that the crank for convenience of operation will be positioned at one side of the casing. The rollers C, C' are vertically disposed on either side of the casing in such positions that the film P carried thereby may be drawn transversely across the openings 13, 13' in the rear end of the casing. The rollers may be mounted for rotation between suitable lateral projections 16 and 16' on the bottom and top parts, respectively, of the casing; and they may be mounted as by removable pins 17, for ready attachment and detachment in order to exchange the films. For the operation of roller C which may in the present embodiment be called the film winding roller, the shaft 14 is provided with a worm gear 18 in mesh with a driven gear 19 attached to the top of the roller C. Upon the operation of the crank 15, the film P is wound upon the roller C, unwinding from the roller C' and passing transversely across the light openings 13 and 13'.

The shutter roll is attached to and between the front ends of shutter levers S and S' which swing on suitable pivot studs 20 suitably secured to the casing. The shutter lever S has an extension 21 pivoted at 22 to one end of a link S'' the opposite end of which is pivoted at 24 to a crank 25 formed on the end of the shaft 14. By this arrangement, simultaneously with the winding of the film upon the roller C, the shutter is moved up and down so as to cover and uncover the lenses L and L' alternatively.

The effect of movement of the images produced on the screen from the figures appearing on the film P is obtained in the following manner: The film P carries by sets in the form of upper and lower progressive pictures, two series of figures or scenes running in a horizontal direction lengthwise of the film. In the drawing the sets $P_0$, $P_0'$, $P_1$, $P_2$, $P_3$, $P_4$ represent successively progressive figures or the like, in which $P_0$ is followed by $P_0'$, $P_1$ by $P_2$, $P_3$ by $P_4$, and so on.

When the band is in the position shown in Figures 1 and 2, the figures $P_1$ and $P_2$ are situated in line with the lenses L and L', and are illuminated by the sources of light F and F' respectively. The image of $P_1$ only will be seen on the screen, as the figure $P_2$ is covered by the shutter in the position illustrated. When the shutter moves into the position shown in dotted lines, the image of $P_2$ will be seen, and $P_1$ will be covered. The movement of the shutter covers and uncovers the lenses L and L' alternately and allows the progressive images $P_1$ and $P_2$ to appear in succession, and this gives the observer a sensation of movement.

At the same time, as the shutter moves, the band P advances slowly and allows the images of P₃ and P₄ to be projected on the screen and so on, whereby a change of pictures is obtained, giving the effect of motion pictures.

The shape and size of this apparatus may be varied and, if desired, the movement may be obtained mechanically by employing any suitable power driving mechanism. The source of light may be electricity from the mains or from batteries, or any other means of illumination may be employed. The film may be of paper, celluloid, fabric or any other suitable material.

What we claim is:

1. In apparatus for projecting animated pictures, projecting means including a pair of spaced apart projecting lenses, film winding mechanism including a rotatable roller, a shutter device swingable to and fro upon a pivot for alternately covering and uncovering said lenses, mechanism for simultaneously operating said roller and said shutter device, comprising a driving shaft, connections including a crank and linkage connecting said shaft with said shutter device, and gearing connections between said shaft and said roller.

2. In apparatus for projecting animated pictures, upper and lower light chambers each including at one end thereof a projecting lens, film winding mechanism for moving a film across the opposite end of said chambers including a vertically disposed film winding roller, a lever swingable up and down on a pivot and carrying a shutter for alternately covering and uncovering said lenses, a horizontally disposed driving shaft, gearing connections between said shaft and said roller whereby to operate the latter from the former, a crank provided on said shaft, and linkage between said crank and lever whereby to move said lever up and down on the rotation of said shaft.

3. In apparatus for projecting animated pictures, the combination of projecting means including a pair of spaced apart projecting lenses, means for alternately covering and uncovering said lenses comprising a lever swingable to and fro upon a pivot and carrying a shutter supply and take-up rollers for moving an image carrying film past the lenses, said rollers having their axes parallel to the plane of the axes of the lenses, a driving crank shaft, and a connection between said shaft, the take-up roller and said lever for operating the take-up roller and swinging said lever upon the rotation of said shaft.

4. In apparatus for projecting animated pictures, the combination with projecting means including upper and lower projecting lenses, of a shutter, a lever carrying the shutter and pivoted to have up and down motion for alternately covering and uncovering said lenses by said shutter, supply and take-up rollers for moving an image carrying film past the lenses, said rollers having their axes parallel to the plane of the axes of the lenses, a rotary shaft, transmission between said shaft and take-up roller for operating the latter upon the rotation of the former, transmission between said shaft and lever whereby to move the latter up and down upon the rotation of the former, and means for manually rotating said shaft.

5. In a toy apparatus for projecting animated pictures, the combination of up and down motion shutter mechanism for alternately covering and uncovering a pair of projecting lenses having their axes in a vertical plane, supply and take-up rollers for moving an image-carrying film past said lenses, said rollers having their axes parallel to the vertical plane of the axes of the lenses, a manually operated shaft, and means for simultaneously effecting the operation of the take-up roller and the shutter mechanism by the operation of said shaft.

6. In a toy apparatus for projecting animated pictures, upper and lower light chambers each having a projecting lens at its forward end and an aperture at its rear end, means for projecting light forwardly through the rear openings to pass through the light chambers and lenses, supply and take-up rollers for moving an image-carrying film past the rear openings, said rollers having their axes disposed so as to move the film in a plane at right angles to the plane of the axes of the lenses, shutter mechanism for alternately covering and uncovering the lenses, and manually operated means for simultaneously operating the take-up roller and the shutter mechanism.

7. Toy apparatus for projecting animated pictures comprising two light chambers each having a projecting lens at its forward end and an aligned aperture at its rear end, means for projecting light forwardly through the rear openings to pass through the chambers and lenses, supply and take-up rollers, an image-carrying film thereon, said rollers being disposed to move the film past the rear apertures in a plane at right angles to the plane of the axes of the lenses, said film having a row of images individual to each rear aperture and the therewith aligned lens, swingable shutter mechanism adapted in one position to cover one lens and in its other position to cover the other lens, a manually operated crank shaft, and means under the control of the operation of said shaft for actuating the take-up roller and swinging the shutter mechanism.

TOMAS NICOLAU Y GRIÑÓ.
JOSE M. NICOLAU Y GRIÑÓ.